US011014678B2

(12) United States Patent
Ogarrio

(10) Patent No.: US 11,014,678 B2
(45) Date of Patent: May 25, 2021

(54) AIRCRAFT WINDOW PLUG DEVICE

(71) Applicant: Roberto Antonio Ogarrio, Durango, CO (US)

(72) Inventor: Roberto Antonio Ogarrio, Durango, CO (US)

(*) Notice: Subject to any disclaimer, the term of this patent is extended or adjusted under 35 U.S.C. 154(b) by 280 days.

(21) Appl. No.: 16/393,259

(22) Filed: Apr. 24, 2019

(65) Prior Publication Data

US 2019/0329894 A1    Oct. 31, 2019

Related U.S. Application Data

(60) Provisional application No. 62/662,397, filed on Apr. 25, 2018.

(51) Int. Cl.
*B64D 25/00* (2006.01)
*B64C 1/14* (2006.01)

(52) U.S. Cl.
CPC ............ *B64D 25/00* (2013.01); *B64C 1/1484* (2013.01)

(58) Field of Classification Search
CPC .......... B64D 25/00; B64C 1/14; B64C 1/1484
See application file for complete search history.

(56) References Cited

U.S. PATENT DOCUMENTS

| | | | | |
|---|---|---|---|---|
| 2,665,459 A * | 1/1954 | Lee | ............................ | B64C 1/14 49/483.1 |
| 2,989,787 A * | 6/1961 | Smith | ................... | B64C 1/1492 52/202 |
| 4,541,595 A * | 9/1985 | Fiala | ..................... | B64C 1/1492 244/129.3 |
| 5,014,934 A * | 5/1991 | McClaflin | ................. | B64C 1/12 244/129.4 |
| 8,016,235 B2 * | 9/2011 | Ramirez Blanco | ... | B64C 1/1446 244/119 |
| 8,944,381 B2 * | 2/2015 | Ebner | ................... | B64C 1/1492 244/129.3 |
| 10,399,660 B2 * | 9/2019 | Brown | .................... | B64C 1/066 |
| 10,926,860 B2 * | 2/2021 | Perkins | ..................... | B64C 1/18 |
| 2010/0320318 A1 * | 12/2010 | Roth | ....................... | B64C 1/066 244/118.5 |
| 2019/0351991 A1 * | 11/2019 | Monfette | ................ | E06B 3/677 |

* cited by examiner

*Primary Examiner* — Benjamin P Lee
(74) *Attorney, Agent, or Firm* — Leyendecker & Lemire, LLC

(57) ABSTRACT

An aircraft window plug device is described. Embodiments of the aircraft window plug device can include, but are not limited to, a plate, a compression assembly, and a bolt assembly. Components of the compression assembly can be coupled to the plate via the bolt assembly. Typically, the aircraft window plug device can be inserted into a hole created by a window of an aircraft suffering a catastrophic failure. The aircraft window plug device can create an airtight seal to help the aircraft pressurize.

20 Claims, 4 Drawing Sheets

AIRCRAFT WINDOW PLUG DEVICE

CROSS-REFERENCE TO RELATED APPLICATION

This application claims the benefit of U.S. Provisional Application No. 62/662,397, filed Apr. 25, 2018.

BACKGROUND

On occasion, a window of a passenger aircraft can become damaged or break during flight. If the window is blown out, cabin pressure is typically lost and people and things next to the window can be partially or fully sucked out of the cabin due to the initial pressure differential and the rush of exiting air. After the pressure has more or less equalized, the thin air in the cabin may not contain enough oxygen for passengers to breath necessitating the use of oxygen masks. Further, the temperature in the cabin can drop precipitously to dangerous levels.

Because of the dangerous conditions posed by the loss of window integrity in a passenger aircraft, pilots of the aircraft must make a rapid descent to an altitude where the air is breathable and the temperature is not life threatening. The damaged aircraft is typically routed to the nearest airfield for an emergency landing.

Therefore, there is a need for a device that can plug a compromised window in an aircraft to allow cabin pressure and temperatures to remain habitable for passengers on the aircraft such that the aircraft can continue a normal flight plan. As can be appreciated, there may be no available or suitable airfield nearby and/or the aircraft may be flying over hostile/enemy territory.

DETAILED DESCRIPTION

Figure 1A:
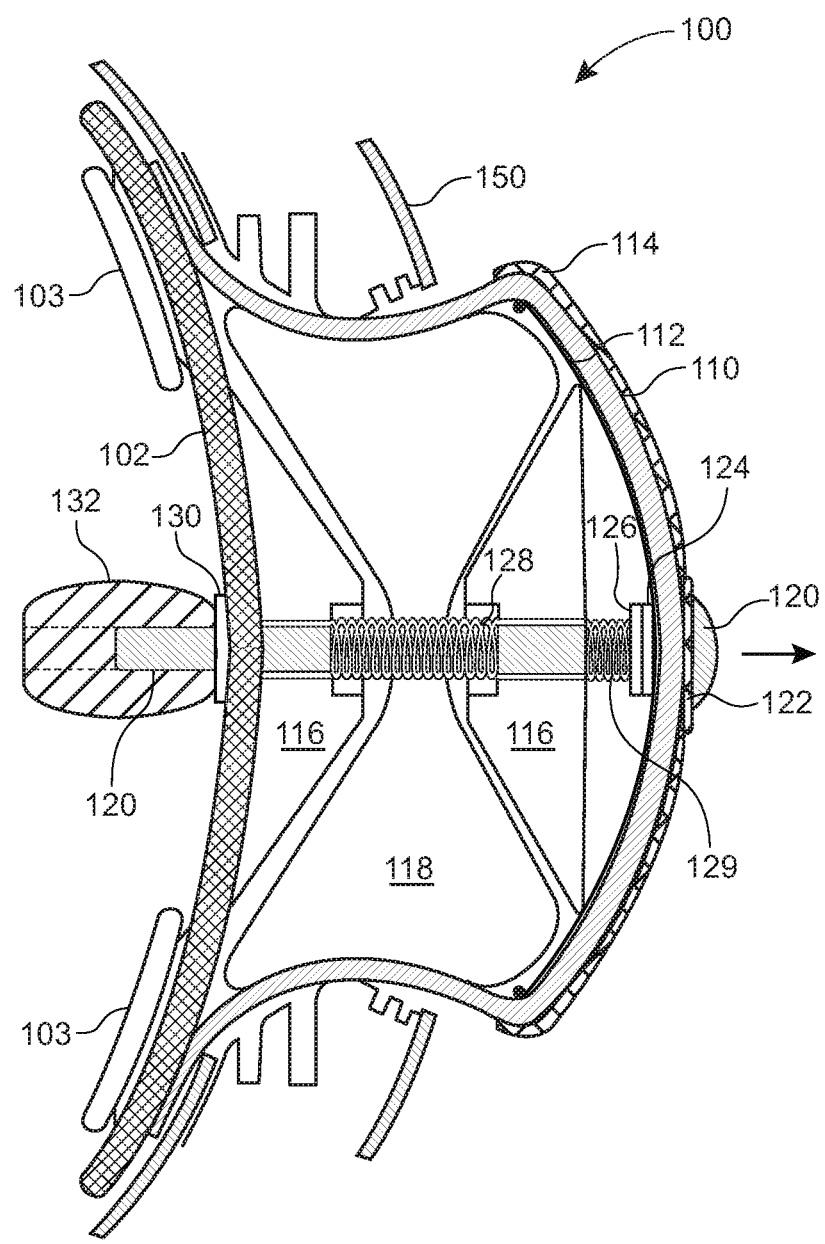
FIG. 1A is a cross-sectional view of an aircraft window plug device inserted into a hole in a fuselage according to one embodiment of the present invention.

Embodiments of the present invention include an aircraft window plug device. The aircraft window plug device can be placed into an aircraft window opening from the inside of a cabin and compressed to completely fill and seal the opening. Once sealed, the cabin can be re-pressurized, and absent other damage or issues with the aircraft, the aircraft can continue to a suitable landing site in a safer and more cautious manner. Other embodiments of the invention include the use of a plug to seal a damaged or broken window, such as can be found on an aircraft.

Of note, when a window in an aircraft becomes damaged, the window itself and the framework can be sucked off and away from the fuselage of the aircraft leaving only an opening. In situations where the window and window frame are still retained in the fuselage after breakage, a crew member or other person can use a crowbar, pipe, or another suitable implement to clear the opening as necessary before the installation of the aircraft window plug device. Embodiments of the aircraft window plug device can include a protective cap that can sustain come impact and abrasion. The protective cap can allow the aircraft window plug device to be implemented to remove small debris on a window frame of an aircraft fuselage upon installation.

In one embodiment, the aircraft window plug device can include, but is not limited to, a plate, a compression assembly, and a bolt assembly. The plate can be implemented to interface with an interior of an aircraft fuselage and the compression assembly can be implemented to interface with an exterior of the fuselage forming an airtight seal. The bolt assembly can be configured to partially mate the compression assembly to the plate and help secure the device to a fuselage of an aircraft, thus creating the airtight seal.

Typically, the plate can have a width and height greater than a width and height of a window opening in a fuselage of an aircraft. Accordingly, when installed in place, edges of the plate can overlap edges of the window opening to help hold the plug in-place especially when the cabin may be re-pressurized and the cabin pressure pushes the plate against the opening. The plate can be made of any suitable material that is both rigid and strong, but in at least one variation, the plate can be comprised of a carbon fiber laminate. The carbon fiber laminate can be strong, rigid, and relatively lightweight to assure a good weight to strength ratio. Generally, the plate can be curved to match a profile of the fuselage surrounding the opening of the aircraft in which the plug is designed for use.

In one embodiment, the plate can include one or more handles or straps that can permit a person to hold and manipulate the plug device during installation and subsequent removal. Additionally, a bolt hole can be provided in an approximate center of the plate through which part of the bolt assembly can be received. The compression assembly is described hereinafter.

The compression assembly can include, but is not limited to, an outer flexible layer, an inner semi-rigid layer, a pair of diametrically opposed semi-rigid members, a protective cap, and a compressible member. In one embodiment, the compressible member can have a substantially torus shape and can be located between the pair of diametrically opposed semi-rigid member. In one embodiment, the semi-rigid members can have a substantially conical frustum shape. Typically, the semi-rigid members can include bores to allow the bolt of the bolt assembly to pass therethrough. The outer flexible layer can be partially coupled to the plate forming a cavity between the outer flexible layer and the plate. Generally, the flexible layer can cover a substantial area of one side of the plate.

The bolt assembly can include, but is not limited to, a bolt, an outer washer, a first nut and washer, a second washer, a first compression spring, a second compression spring, a third washer, a fourth washer, and a knob. The bolt can be passed through the components of the compression assembly and the plate. Typically, a threaded end of the bolt can be passed through the plate with a head of the bolt interfacing with the outer washer and the protective cap of the compression assembly. The bolt assembly can be implemented to compress components of the compression assembly. In one embodiment, the threaded end of the bolt can be colored to allow a user to easily determine when the aircraft window plug device has been compressed. As can be appreciated, the end of the bolt can sit within the knob when in a relaxed configuration. When the knob is tightened on the bolt, the knob can move up the bolt. By using a bright color on the threaded end, the user can easily see when the bolt has passed through the knob.

In one example embodiment, the aircraft window plug device can include, but is not limited to, a plate, a compression assembly, and a bolt assembly. The compression assembly can include, but is not limited to, a flexible member coupled to the plate, a cavity formed between the plate and the flexible member, a semi-flexible member located in the cavity proximate the flexible member, a protective cap located on an exterior of the flexible member, a pair of semi-rigid members located in the cavity, and a torus shaped member located between the pair of semi-rigid members. The bolt assembly can be adapted to compress the compression assembly against the plate. The bolt assembly can include, but is not limited to, a bolt, a spring located in the center of the torus shaped member and between the pair of semi-rigid members, and a knob threadably coupled to the bolt and located on an exterior of the plate. The bolt can be adapted to pass through the protective cap, the flexible member, the semi-flexible member, the spring, the pair of semi-rigid members, a center of the torus shaped member, and the plate.

Of note, at an intersection of the flexible member with a backside of the plate, the flexible member can flare outwardly to form a flange. The flange can act to create an airtight seal between the backside of the plate around its edges and the edges of an interior of the fuselage window opening.

The bolt can extend from a bolt head that can be braced against a washer and a distal end of the protective cover located on the flexible member through the compression assembly components and through the plate. The knob can be secured over a threaded end of the bolt. By turning the knob, the bolt through the head of the bolt pulls the washer towards a washer located on a proximal side of the plate, thus compressing the components of the compression assembly and causing the torus shaped compressible member to compress lengthwise and to expand outwardly widthwise.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment, "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The term "approximately," as used in this specification and appended claims, refers to plus or minus 10% of the value given.

The term "about," as used in this specification and appended claims, refers to plus or minus 20% of the value given.

The terms "generally" and "substantially," as used in this specification and appended claims, mean mostly, or for the most part.

Directional and/or relationary terms such as, but not limited to, left, right, nadir, apex, top, bottom, vertical, horizontal, back, front and lateral are relative to each other and are dependent on the specific orientation of a applicable element or article, and are used accordingly to aid in the description of the various embodiments and are not necessarily intended to be construed as limiting.

An Embodiment of an Aircraft Window Plug Device

Referring to FIGS. 1A-4, detailed diagrams of an embodiment 100 of an aircraft window plug device is illustrated. The aircraft window plug device 100 can be implemented to plug a hole in a fuselage of an aircraft. For instance, the plug device 100 can be implemented when a window in an aircraft suffers a catastrophic failure and leaves a hole in the fuselage of the aircraft. As will be described hereinafter, the aircraft window plug device 100 can be implemented to plug the hole in the fuselage allowing cabin pressure to be maintained.

Figure 1B:
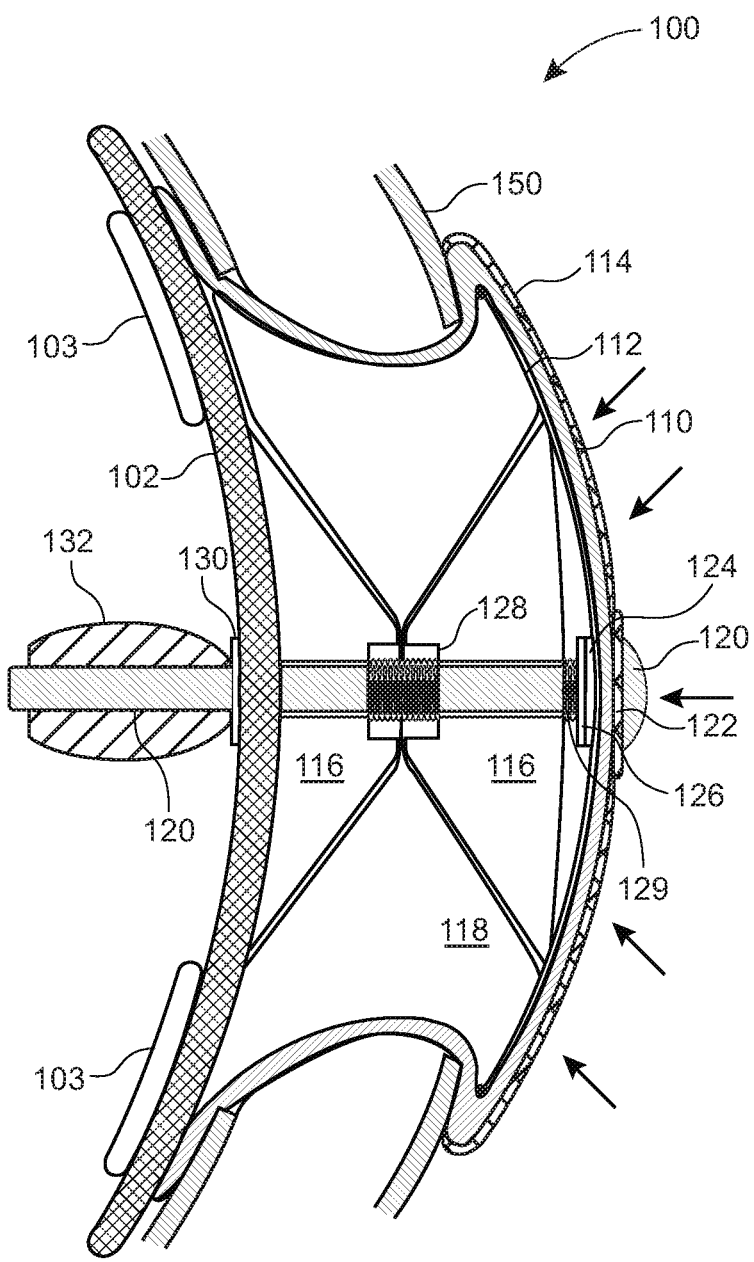
FIG. 1B is a cross-sectional view of an aircraft window plug device inserted into a hole and compressed against a fuselage according to one embodiment of the present invention.
Figure 2:
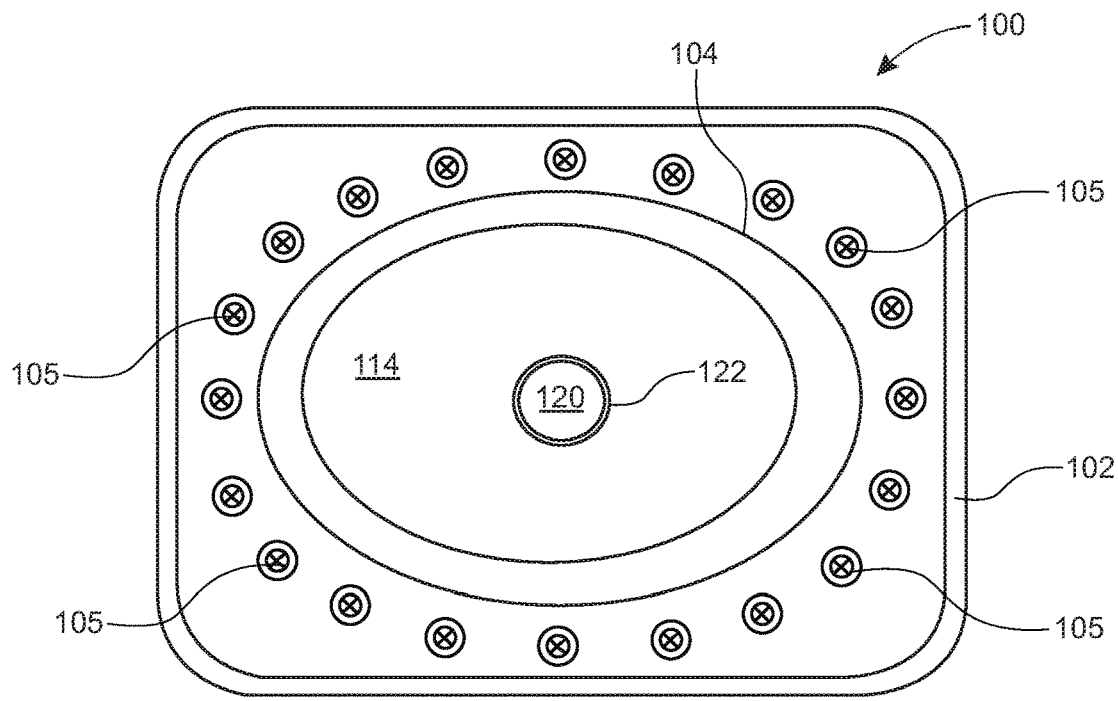
FIG. 2 is a top view of an aircraft window plug device according to one embodiment of the present invention.
Figure 3:
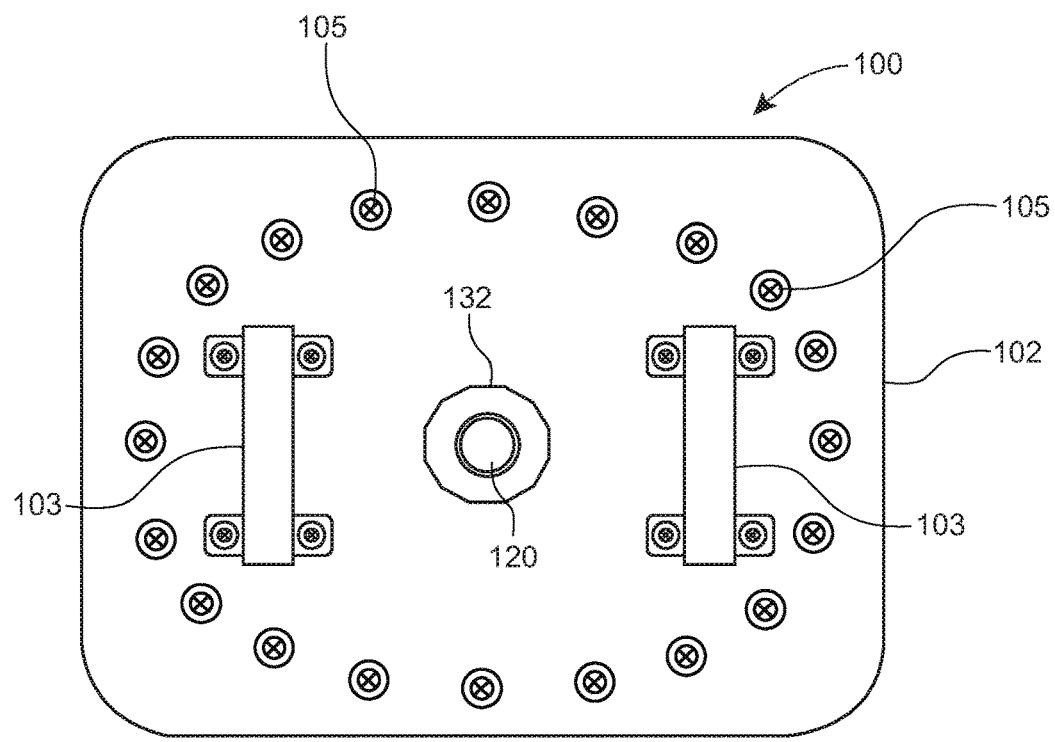
FIG. 3 is a bottom view of an aircraft window plug device according to one embodiment of the present invention.
Figure 4:
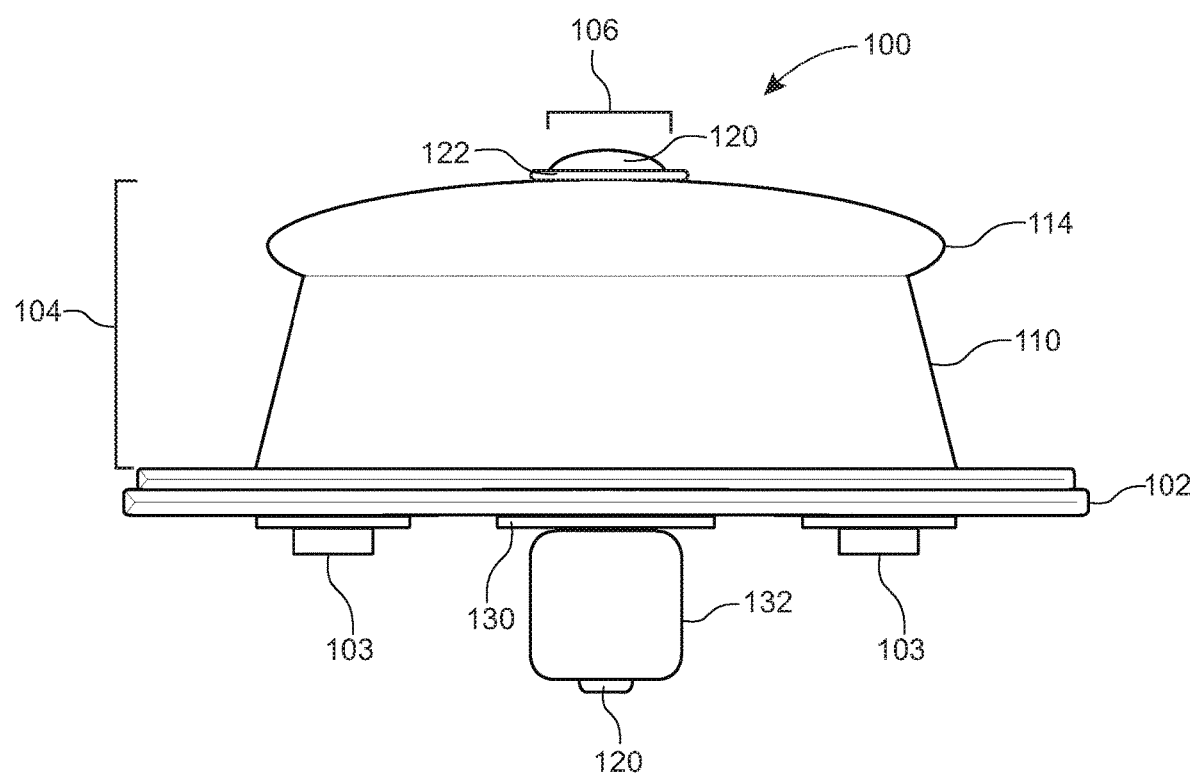
FIG. 4 is a side view of an aircraft window plug device according to one embodiment of the present invention.

Referring to FIG. 1A, a cross-sectional view of the aircraft window plug device 100 inserted into an opening in a fuselage 150 of an aircraft is shown. Referring to FIG. 1B, a cross-sectional view of the aircraft window plug device 100 in a compressed configuration in the opening of the fuselage 150 is shown. Referring to FIG. 2, a top view of the aircraft window plug device 100 is shown. Referring to FIG. 3, a bottom view of the aircraft window plug device 100 is shown. Referring to FIG. 4, a side view of the aircraft window plug device 100 is shown.

Generally, the aircraft window plug device 100 an include, but is not limited to, a plate 102, a compression assembly 104, and a bolt assembly 106, as shown in FIG. 4. The components of the plug device 100 can be coupled together via the bolt assembly 106 and a plurality of fasteners 105. The plate 102 can be configured to interface with an interior of an aircraft fuselage, as shown in FIGS. 1A-1B. A portion of the compression assembly 104 can be configured to interface with an exterior of the aircraft fuselage as shown in FIGS. 1A-1B. Typically, the compression assembly 104 can be passed through a hole in the aircraft fuselage with the plate 102 keeping the device 100 from passing all the way through the hole. The bolt assembly 106 can be implemented to compress the components of the compression assembly 104.

The plate 102 can be manufactured from a suitable material that can be both rigid and strong. For instance, the plate 102 can be manufactured from carbon fiber, a rigid polymer, metal, a combination thereof, etc. In one example embodiment, the plate 102 can be comprised of a carbon fiber laminate. As can be appreciated, a carbon fiber laminate can be strong, rigid, and relatively lightweight to assure a good weight to strength ration. Generally, the plate 102 can be curved to match a profile of a fuselage surrounding the opening of the aircraft in which the plug is designed for use. As shown in FIGS. 1A-1B and 3-4, the plate 102 can include a pair of straps 103 that can be implemented as handles. The straps 103 can be implemented to permit a person to hold and manipulate the device 100 during installation and subsequent removal. Additionally, a bolt hole (not shown) can be provided in an approximate center of the plate 102 through which part of the bolt assembly 106 can be received.

In one embodiment, the compression assembly 104 can include, but is not limited to, an outer layer 110, an inner semi-rigid layer 112, a protective layer 114, a pair of rigid members 116, and a compressible member 118. The outer layer 110 can typically be manufactured from a flexible (or elastomeric) material having abrasion resistant properties. For instance, the outer layer 110 may be comprised of rubber or a synthetic rubber. Typically, the outer layer 110 can be coupled to the plate 102 via the plurality of fasteners 105, as shown in FIGS. 2-3. A cavity can be formed between the plate 102 and the outer layer 110. As shown, the outer layer 110 can cover a substantial area of one side of the plate 102. Of note, other means of coupling the outer layer 110 to the plate 102 are contemplated. For instance, the outer layer 110 may be bonded to the plate 102 via an adhesive. The inner semi-rigid layer 112 can typically be manufactured from a semi-rigid plastic or metal. The protective layer 114 can typically be manufactured from a material having high abrasive resistance qualities as the protective layer 114 will interact first with the fuselage 150 and any broken windows. The pair of semi-rigid members 116 can typically be manufactured from a semi-rigid or rigid material that does not deform. Of note, the pair of semi-rigid members 116 can be implemented to provide shape and structure to the device 100 in a compressed state. The compressible member 118 can typically be manufactured from an elastomeric material. In one instance, the compressible member 118 can be manufactured from the same material as the outer layer 110.

In one embodiment, the pair of rigid members 116 can each have a substantially conical frustum shape. Typically, the pair of rigid members 116 can each include a bore to allow a bolt of the bolt assembly 106 to pass therethrough.

In one embodiment, the compressible member 118 can have a substantially torus shape and can be located between the pair of rigid members 116. Typically, a bolt of the bolt assembly 106 can pass through the hole of the compressible member 118.

The bolt assembly 106 can include, but is not limited to, a bolt 120, an outer washer 122, a first nut and washer 124, a second nut 126, a first compression spring 128, a second compression spring 129, a second washer 130, and a knob 132. The bolt assembly 106 can be implemented to compress components of the compression assembly 104 against the plate 102. The bolt 120 can include a threaded end configured to couple to the knob 132 and a head on an opposite end that is configured to interface with the exterior of the compression assembly 104. As shown, the outer washer 122 can be implemented between the protective cap 114 and the head of the bolt 120.

As can be appreciated, when the knob 132 is tightened, the head of the bolt 120 can pull the outer layer 110 towards the plate 102. In one embodiment, the second washer 130 can be manufactured from a fluoropolymer (e.g., polytetrafluoroethylene) or another slick material. As shown in FIGS. 1A-1B, the second washer 130 can be provided underneath the knob 132 to help reduce friction encountered when tightening the bolt 120 during an installation of the plug 100.

Referring back to FIG. 1B, the aircraft window plug device 100 is shown in a compressed configuration inside the opening of the fuselage 150. As can be appreciated, the knob 132 can be turned to tighten on the bolt 120 to bring the internal components of the compression assembly 104 together. Of note, as the compressible member 118 is compressed, the torus shaped compressible member 118 can push out to interface with the opening in the fuselage. The inner semi-rigid member 112 can be implemented to help an upper portion of the outer flexible layer 110 interface with a portion of an exterior of the fuselage 150 proximate the opening in the fuselage 150. Typically, ends of the inner semi-rigid member 112 can be located outside a perimeter of the opening in the fuselage 150.

Described hereinafter is one example implementation of the aircraft window plug device 100.

The aircraft window plug device 100 can typically be stowed in an easily accessible place on a plane. For instance, the device 100 can be stored in an overhead bin or in a storage locker accessible by airline crew members. In some instances, more than one plug device 100 can be provided on a plane in case of multiple broken windows.

When a window is broken, passengers are typically ushered away from the area of the break as best possible. As necessary, the window opening can be cleaned out with a bar, pipe, or another tool to remove the remaining window frame if it has not already blown out. If the frame is still firmly secured in the fuselage, a tool can be used to break out the remaining pieces of the translucent window panes.

The aircraft window plug device 100 may be retrieved by a crew member. It is to be noted that an able passenger can be conscripted to assist as necessary. The aircraft window plug device 100 can be checked to verify that the compression assembly 104 is in a relaxed or least compressed state. Typically, to achieve the relaxed state, the knob 132 can be turned counterclockwise until no resistance is applied from the compression assembly 104.

Next, the aircraft window plug device 100 can be picked up by the handles 103 provided on an interior of the plate 102. Typically, the plate 102 can include signage indicating instructions on how to install the device 100 and also signage indicating an "UP" and "DOWN" orientation for the device 100 when installing.

The plug 100 can then be directed into the hole where the window used to be with the compression assembly 104 going first. Of note, if the cabin is not fully depressurized, the cabin pressure may assist in seating the plug 100 in the hole. Otherwise, the crew member can push the plug 100 until they either feel the inner semi-rigid layer 112 snap into place about an outside edge of the fuselage 150 or the plate 102 bottoms out against the inside surface of the fuselage 150.

Once the plug 100 is in place, the crew member can rotate the knob 132, typically clockwise, to tighten the bolt 120 and pull the compression assembly 102 inwardly thereby expanding the compressible member 118 against the sides and edges of the fuselage 150 effectively and tightly sealing the aircraft cabin from the outside.

Subsequently, the aircraft cabin can be re-pressurized and heated. As long as the life-threatening damage to the aircraft is limited to the damaged window, the aircraft can continue to fly at the optimal altitude to an intended destination or make an interim landing at a more relaxed and less panicked pace.

After the aircraft has safely landed and the plug 100 is no longer needed, the aircraft window plug device 100 can be removed from the window opening by loosening the knob 132 to relax the compression assembly 104 and pulling the plug 100 out of the opening. Components of the plug 100 can typically be inspected to ensure no catastrophic damage has occurred to the components. Provided no components have sustained damage, the plug 100 can be re-stowed in the airplane ready for future use.

Alternative Embodiments and Variations

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

Of note, dimensions of the components of the aircraft window plug device can be scaled up and down to more accurately and effectively interface with an aircraft fuselage based on a size of windows on a particular aircraft fuselage. As can be appreciated, embodiments of the aircraft window plug device can be manufactured for each size of window included in commercial, military, and transport aircraft.

I claim:

1. An aircraft window plug device comprising:
a plate;
a compression assembly comprising:
    an outer flexible member coupled to the plate, a cavity being formed between the plate and the outer flexible member;
    an inner semi-rigid member located in the cavity proximate the outer flexible member;
    a protective cap;
    a pair of semi-rigid members located in the cavity; and
    a torus shaped member located between the pair of semi-rigid members;
a bolt assembly adapted to compress the compression assembly against the plate, the bolt assembly comprising:
    a bolt;
    a first spring located in the cavity between the pair of semi-rigid members and passing through a center of the torus shaped member; and
    a knob threadably coupled to the bolt and located on an exterior of the plate.

2. The aircraft window plug device of claim 1, wherein the plate is manufactured from a carbon fiber laminate.

3. The aircraft window plug device of claim 1, wherein the aircraft window plug device is adapted to fit into a hole in an aircraft fuselage.

4. The aircraft window plug device of claim 3, wherein the plate is adapted to interface with an interior of the aircraft fuselage.

5. The aircraft window plug device of claim 1, wherein the torus shaped member is comprised of an elastomer.

6. The aircraft window plug device of claim 1, wherein the bolt passes through the protective cap, the flexible member, the inner semi-rigid member, the first spring, the pair of semi-rigid members, a center of the torus shaped member, and the plate.

7. The aircraft window plug device of claim 1, wherein the bolt assembly further includes:
a second spring located between an exterior of one of the pair of semi-rigid members and the inner semi-rigid member.

8. The aircraft window plug device of claim 1, wherein the flexible member is comprised of rubber.

9. The aircraft window plug device of claim 1, wherein the plate includes a pair of straps.

10. An aircraft window plug device comprising:
a plate having a first side and a second side;
a compression assembly; and
a bolt assembly adapted to compress the compression assembly against the second side of the plate;
wherein the bolt assembly comprises:
    a bolt; and
    a knob threadably coupled to the bolt and located on the first side of the plate;
wherein the compression assembly comprises:
    a flexible member coupled to the second side of the plate, wherein a cavity is formed between the second side of the plate and the flexible member;
    a pair of semi-rigid members each having a substantially conical frustum shape, the pair of semi-rigid members being located within the cavity; and
    a torus shaped member located between the pair of semi-rigid members inside the cavity.

11. The aircraft window plug device of claim 10, wherein the plate has a substantially rectangular shape.

12. The aircraft window plug device of claim 11, wherein a perimeter portion of the flexible member is coupled to a perimeter portion of the plate.

13. The aircraft window plug device of claim 12, wherein a plurality of fasteners couple the flexible member to the plate.

14. The aircraft window plug device of claim 10, wherein a spring (i) is located between the pair of semi-rigid members, and (ii) passes through the torus shaped member.

15. The aircraft window plug device of claim 10, wherein the torus shaped member and the flexible member are manufactured from the same material.

16. The aircraft window plug device of claim 10, wherein the plate includes a pair of handles located on the first side.

17. The aircraft window plug device of claim 10, wherein a protective cap covers a portion of an exterior of the flexible member.

18. The aircraft window plug device of claim 10, wherein the compression assembly further includes:
a semi-rigid plate proximate the flexible member and located inside the cavity.

19. The aircraft window plug device of claim 18, wherein the semi-rigid plate has a substantially circular shape.

20. A method of implementing an aircraft window plug device in an aircraft window that has suffered a failure in-flight, the method comprising:
providing an aircraft window plug device, the aircraft window plug device comprising:
    a plate adapted to interface with an interior of an aircraft fuselage; a compression assembly adapted to interface with an exterior of the aircraft fuselage, the compression assembly comprising:
    an outer flexible member coupled to the plate, a cavity being formed between the plate and the outer flexible member; an inner semi-rigid member located in the cavity proximate the outer flexible member; a protective cap;
    a pair of semi-rigid members located in the cavity; and a torus shaped member located between the pair of semi-rigid members;

a bolt assembly adapted to compress the compression assembly against the plate, the bolt assembly comprising: a bolt;
a first spring located in the cavity between the pair of semi-rigid members and passing through a center of the torus shaped member; and
a knob threadably coupled to the bolt and located on an exterior of the plate;
inserting the aircraft window plug device into an opening created by the window failure, wherein the plate interfaces with the interior of the fuselage; and
rotating the knob of the bolt assembly to pull the inner semi-rigid member against an exterior of the fuselage;
wherein an airtight seal is formed between the aircraft window plug device and the fuselage.

* * * * *